United States Patent
Takano

(10) Patent No.: US 10,264,260 B2
(45) Date of Patent: Apr. 16, 2019

(54) MOVING PICTURE ENCODING IN WHICH BASE QUANTIZATION IS BASED ON CORRECTED MACROBLOCK COMPLEXITY

(71) Applicant: NEC Corporation, Minato-ku, Tokyo (JP)

(72) Inventor: Fumiyo Takano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 256 days.

(21) Appl. No.: 14/895,028

(22) PCT Filed: May 19, 2014

(86) PCT No.: PCT/JP2014/002610
§ 371 (c)(1),
(2) Date: Dec. 1, 2015

(87) PCT Pub. No.: WO2014/199566
PCT Pub. Date: Dec. 18, 2014

(65) Prior Publication Data
US 2016/0127729 A1 May 5, 2016

(30) Foreign Application Priority Data
Jun. 13, 2013 (JP) .................................. 2013-124658

(51) Int. Cl.
*H04N 19/126* (2014.01)
*H04N 19/176* (2014.01)
(Continued)

(52) U.S. Cl.
CPC ......... *H04N 19/126* (2014.11); *H04N 19/115* (2014.11); *H04N 19/14* (2014.11); *H04N 19/159* (2014.11); *H04N 19/176* (2014.11)

(58) Field of Classification Search
CPC .... H04N 19/126; H04N 19/115; H04N 19/14; H04N 19/159; H04N 19/176
(Continued)

(56) References Cited

U.S. PATENT DOCUMENTS

2004/0202247 A1* 10/2004 Chang ................. H04N 19/172
375/240.03
2010/0316119 A1* 12/2010 Mathew ............... G06K 9/3266
375/240.03

FOREIGN PATENT DOCUMENTS

JP H10-164577 A 6/1998
JP 1998-224786 A 8/1998
(Continued)

OTHER PUBLICATIONS

International Search Report for PCT Application No. PCT/JP2014/002610, dated Aug. 5, 2014.
(Continued)

*Primary Examiner* — Jamie J Atala
*Assistant Examiner* — Ayman A Abaza

(57) ABSTRACT

A video encoding device includes: circuitry configured to perform an orthogonal transform on a target picture to obtain an orthogonal transform coefficient; quantize the orthogonal transform coefficient for each macroblock of the target picture; and calculate, for a target macroblock in the target picture, a base quantization step which is a variable for matching a generated code size of the target picture with a target code size set for the target picture, determine a quantization step to be applied to quantizing for the target macroblock by weighting the calculated base quantization step with an activity of the target macroblock, and provide the quantization step.

3 Claims, 6 Drawing Sheets

(51) Int. Cl.
*H04N 19/14* (2014.01)
*H04N 19/159* (2014.01)
*H04N 19/115* (2014.01)

(58) Field of Classification Search
USPC .................................................... 375/240.18
See application file for complete search history.

(56) References Cited

FOREIGN PATENT DOCUMENTS

| JP | 11-346365 A | 12/1999 |
| JP | 2001-025016 A | 1/2001 |
| JP | 2002-247584 A | 8/2002 |
| JP | 2006-054801 A | 2/2006 |
| JP | 2006-086861 A | 3/2006 |
| JP | 2007-235928 A | 4/2007 |
| JP | 2009-135902 A | 6/2009 |

OTHER PUBLICATIONS

English translation of Written opinion for PCT Application No. PCT/JP2014/002610.
Japanese Office Action for JP Application No. 2015-522495 dated Feb. 27, 2018 with English Translation.

\* cited by examiner

MOVING PICTURE ENCODING IN WHICH BASE QUANTIZATION IS BASED ON CORRECTED MACROBLOCK COMPLEXITY

This application is a National Stage Entry of PCT/JP2014/002610 filed on May 19, 2014, which claims priority from Japanese Patent Application 2013-124658 filed on Jun. 13, 2013 the contents of all of which are incorporated herein by reference, in their entirety.

TECHNICAL FIELD

The present invention relates to a video processing technology, and more specifically to a video encoding technology.

BACKGROUND ART

In image compression methods, represented by Moving Pictures Expert Group (MPEG) standards, including combination of motion compensation and discrete cosine transform (DCT), rate control is performed so that a bitstream is transmitted to a transmission line at a desired rate.

FIG. 4 illustrates an MPEG layer structure. MPEG defines a layer structure including a sequence layer, a GOP (Group of Picture) layer, a picture layer, a slice layer, and a macroblock (MB) layer. The actual code size for a certain time period can be adjusted by changing a quantization step by adjusting data (Q scale) included in the slice layer and the MB layer. It is so designed that a larger Q scale sets a larger quantization step. In the following description, a quantization step is denoted by Q.

FIG. 5 is a graph illustrating a relationship between a generated code size and a quantization step. In the illustrated example, the quantization step takes 31 values, i.e., Q1 to Q31. As illustrated in FIG. 5, the actual code size is substantially inversely proportional to the quantization step. This means that a larger quantization step leads to rougher quantization and consequently makes the generated code size small. In contrast, a smaller quantization step leads to finer quantization and consequently makes the actual code size larger.

Rate control is performed for each specific length-equalized unit (picture group of a specific number of pictures) so that the total of generated code sizes (total code size) is to be equal to a specific encoded size.

A known example of such a rate control method is a control method in MPEG-2 Test Model 5 (referred to as "TM5" below).

The rate control in TM5 is described below.

In this control, first, a target code size of a target picture group (a picture group of a single length-equalized unit being a current target of encoding) is allocated to each of the pictures of the target picture group. In the following description, the target code size of a picture group of a single length-equalized unit is denoted by "Sg", and the target code size of a single picture is denoted by "Sp".

As illustrated in FIG. 6, larger target code sizes Sp are assigned to an I picture and P pictures, which are used as reference images, whereas target code sizes Sp that are smaller than those assigned to the I picture and the P pictures are assigned to B pictures, which are not used as reference images.

Subsequently, the pictures of the target picture group is encoded by repeating encoding of a target picture and reassignment of the target code sizes Sp to the remaining pictures of the target picture group according to the generated code sizes of the encoded pictures.

A quantization step Q of a target picture is calculated according to Equation (1) using an estimated complexity Xest.

A complexity is an index indicating the difficulty of encoding an encoding target. In this technology, a complexity Xest of a target picture is estimated to be the product of the generated code size of encoded pictures of the same picture type as that of the target picture and the average quantization step.

$$Q = Xest/Sp \qquad (1)$$

Encoding a picture is performed separately for each macroblock. Specifically, the quantization step Q calculated according to Equation (1) is used for the first macroblock of a target picture. The quantization step Q is used for each of the second and subsequent macroblocks by being adjusted on the basis of the difference between the total of the generated code sizes of the encoded macroblocks and the target code size Sp so that the total code size of the target picture is to be closer to the target code size Sp.

Since the quantization step takes discrete values as illustrated in FIG. 5, the quantization step Q calculated according to Equation (1) does not necessarily completely match any of the values Q1 to Q31. For example, when the quantization step Q calculated according to Equation (1) takes a value between Q5 and Q6, to make sure that the total code size of the concerning picture does not exceed the target code size Sp, Q6 which is a larger value is selected as the quantization step Q. This applies also to the cases to be given below, although not mentioned repeatedly.

Upon completion of encoding the target picture, in this technology, the target code sizes Sp are modified by reallocating, on the basis of the generated code sizes, the target code size to the pictures, in the target picture group, that are not encoded yet so that the total code size of the target picture group is to be substantially the same as the target code size Sg.

Then, the complexity Xest is estimated for the next target picture. The quantization step Q is calculated for the picture by using the estimated complexity Xest and the target code size Sp, which is obtained through the modification, of the target picture, and the picture is encoded.

As described above, in this rate control technology, feedback is performed on the current average rate on the basis of the relationship between the past quantization steps and the total code size. As a consequence of this control, while the average code size (average rate) per unit time fluctuates in a short span, the average code size per unit time is made approximate to the target code size in a long span.

In the case of applications, such as a videotape recorder (VTR), expecting editing or other processing, operation, for example, editing by the frame, is performed, and hence requiring that the code size be controlled in such a manner as to reliably prevent the total code size of a unit of editing from exceeding a certain size. To make sure that the target code size does not exceed the certain size in the case of such applications, it is necessary to leave a margin when setting a target code size for each picture (i.e. to set a target code size at a smaller value).

In the above-described rate control technology, concerning a comparison between macroblocks in a single picture, when the actual generated code size of prior macroblocks are larger than the estimated code size of the prior macroblocks, the code size to be allocated to latter macroblocks is reduced in order to bring the generated code size to be approximated to the estimated code size of the picture (corresponding to the target code size Sp). This consequently deteriorates the image quality of the latter macroblocks. In addition, due to the variation in quantization step between the macroblocks, areas for which rough quantization is performed stand out, which deteriorates subjective image quality.

Concerning a comparison between pictures in a picture group of a single length-equalized unit deteriorate, when the actual generated code size of prior pictures are larger than the estimated code size of the prior pictures, the code size to be allocated to latter pictures is reduced. This consequently deteriorates image quality of the latter pictures. The reason why the code size to be allocated to the latter pictures is reduced is to make the actual generated code size of the picture group be approximated to the target code size Sg of the picture group. In addition, due to the variation in quantization step between the pictures, pictures for which rough quantization is performed stand out, which deteriorates subjective image quality.

A quantization step obtained for a macroblock by the above-described technology is referred to as a "base quantization step" in order to differentiate this quantization step from a quantization step obtained for a macroblock through "adaptive quantization" to be described later. Specifically, a base quantization step is the quantization step Q calculated according to Equation (1) for the first macroblock of a target picture, and is obtained for each of the second and subsequent macroblocks by adjusting the quantization step Q on the basis of the generated code sizes of the encoded macroblocks.

TM5 employs an "adaptive quantization" technology that improves the image quality by weighting the above-described base quantization step according to human visual characteristics and using the weighted base quantization step for quantization of the macroblock. In this technology, the base quantization step is weighted by using an activity as a parameter indicating visual characteristics so that a part likely to stand out if the image quality of the part is deteriorated (e.g., a smooth part) is subjected to finer quantization whereas a part less likely to stand out (e.g., a part corresponding to a complicated pattern) is subjected to rougher quantization. This weighting improves subjective image quality compared to other cases with the same or similar code size. Since the above change in quantization step is made according to visual characteristics, it is possible to prevent deterioration of subjective image quality due to variation in quantization step as in the above-described case.

An activity, which is used as a parameter indicating visual characteristics in adaptive quantization, is known to be calculated, for example, by using the variant of luminance values in a block as a feature quantity as in TM5. Specifically, in TM5, a quantization step is determined for each macroblock by using a concerning activity as follows.

First, according to Equation (2), an activity $act\_j$ of a macroblock (MBj), which consists of 16×16 pixels, is obtained by use of the minimum value of variances $vblk\_n$ ($1\leq n\leq 4$), which are variances of luminance values in the four sub-blocks, each of which consists of 8×8 pixels, in the macroblock.

$$act\_j=1+\min(vblk\_1, vblk\_2, vblk\_3, vblk\_4) \quad (2)$$

According to Equation (3), a normalized activity $Nact\_j$ of the macroblock MBj is obtained by use of an average value $avg\_act$ of the activities $act\_j$ of all the macroblocks in the single picture.

$$Nact\_j=(2\times act\_j+avg\_act)/(act\_j+2\times avg\_act) \quad (3)$$

According to Equation (4), a quantization step $Qact\_j$, based on adaptive quantization, of the macroblock MBj is calculated. In Equation (4), Qbase denotes the above-described base quantization step, and $Nact\_j$ denotes a normalized activity of the macroblock MBj and is calculated according to Equation (3).

$$Qact\_j=Qbase\times Nact\_j \quad (4)$$

To achieve high subjective image quality according to visual characteristics, it is considered to be preferable to satisfy both of the following conditions: differences among the quantization steps Qact of the respective macroblocks depend on the activities; and the same quantization step is used for the macroblocks having the same activity.

Although an activity is calculated on the basis of the variance of luminance values in the above-described technology, it is also known that an activity may be calculated on the basis of a luminance component and chrominance components as disclosed in PTL 4, for example.

However, in adaptive quantization, a quantization step to be used for a macroblock is changed from Qbase to Qact, and this change increases the divergence between generated code size and estimated code size in comparison with the case not employing adaptive quantization. For this reason, when generated code size is larger than estimated code size, code size to be allocated to the subsequent areas (macroblocks or pictures) is reduced, consequently deteriorating the image quality of the subsequent areas. In contrast, when generated code size is smaller than estimated code size, the image quality of the area is lowered by a degree according to the code size left unused.

PTL 1 discloses a technology for preventing this problem. In this technology, the activity of a target macroblock is weighted according to the difference between a size of generated code stored in a virtual buffer and an estimated code size, at the time of determining a quantization step for the target macroblock. Specifically, a larger difference between the generated code size and the estimated code size sets a smaller weight to the activity of the target macroblock (e.g., second exemplary embodiment). The quantization step for the macroblock is determined by using the weighted activity in Equation (4) instead of $Nact\_j$.

Using this technique brings the total code size closer to the target code size by weighting the activity of the target macroblock according to the difference between the generated code size and the estimated code size. However, when the weight of the activity is changed, macroblocks having the same activity are encoded using different quantization steps. This reduces the effect of adaptive quantization, consequently deteriorating image quality.

PTL 2 discloses a technology for encoding areas having the same activity, by use of the same quantization step. While encoding a single picture, in this technology, the base quantization step Qbase in Equation (4) is not changed, and the same value is used for the macroblocks. In this way, the same quantization step $Qact\_j$ is used for the macroblocks having the same activity $Nact\_j$ in the single picture.

PTL 2 describes that, since the generated code size does not agree with the target code size in this technology, it is preferable to set a target code size with a margin of 20%.

PTL 3 discloses a technology of increasing the accuracy in estimation of a complexity when controlling rate control on the basis of the estimated complexity. In the method according to TM5, the generated code size of a target picture is estimated by assuming, as the complexity Xest of the target picture, the product of a generated code size of a past picture and the average quantization step. Accordingly, when the target picture and the past picture have a low correlation, for example, when the pattern of the target picture is significantly different from that of the past picture, or when a scene is changed to a different scene, the generated code size for the target picture is estimated significantly wrong, and distribution of the code size becomes inaccurate, which consequently causes a problem that encoding efficiency is deteriorated.

According to the technology disclosed in PTL 3, as described, for example, in the paragraphs [0027] to [0032], the complexity Xest is estimated for the I picture to be encoded first after a scene change, on the basis of the variance of the picture, and the complexity Xest is estimated for a picture that is the P picture or the B picture to be encoded first after a scene change, on the basis of an estimation error value obtained from a result of a motion vector search between the picture and a reference picture of the picture. For the estimation of the complexity Xest of each of these pictures, Equation (5) described below is used.

$$Xest = a \times F2 + b \times F + c \qquad (5)$$

In Equation (5), a, b, and c are fixed values set for each picture type. A feature quantity F is, in the case of an I picture, the variant of the picture, and in the case of a P picture or a B picture, an estimation error value obtained from the result of the motion vector search between the picture and a reference picture of the picture.

For the pictures not corresponding to any of the above-described pictures, a complexity is estimated on the basis of the generated code sizes of the encoded pictures of the same type and the average quantization step, as in the technology according to TM5.

PTL 3 also discloses that the relationship between the complexity estimated according to Equation (5) and the complexity obtained from an encoding result (the product of the generated code size of the encoded pictures and the average quantization step) is stored separately for picture types for past several pictures, and the coefficients in Equation (5) are modified separately for the picture types on the basis of the stored data. This process increases the accuracy in estimation of a complexity.

CITATION LIST

Patent Literature

PTL 1: Japanese Unexamined Patent Application Publication No. 2007-235928
PTL 2: Japanese Unexamined Patent Application Publication No. 10-224786
PTL 3: Japanese Unexamined Patent Application Publication No. 2002-247584
PTL 4: Japanese Unexamined Patent Application Publication No. 2009-135902

SUMMARY OF INVENTION

Technical Problem

In order to encode a video with high quality, it is necessary to make the quantization steps for parts having the same activity be the same or as close to among them as possible, and to change quantization steps according to the differences among the activities.

The technology disclosed in PTL1 can bring a generated code size close to a target code size. However, in this technology, since an activity itself is weighted, the quantization steps of macroblocks having the same actual activity result in being different, and the actual differences in the activities are not reflected in the differences in the quantization steps, consequently reducing image quality.

In the technology disclosed in PTL 2, it is necessary to make, for the target code size Sp, a margin of 20%, in order to make the generated code size of each picture equal to the target code size Sp of the picture. However, leaving code size of 20% is commonly known to cause significant deterioration in image quality that is visually recognizable. Hence, it is difficult to achieve high image quality with this technology. Especially when the generated code size of a small range, such as a single frame, is not allowed to exceed a certain size, for example, in the case of an application expecting editing, a larger margin needs to be made for the target code size Sp to make sure that the requirement is satisfied. This significantly deteriorates image quality.

It is possible for the technique disclosed in PTL 3 to increase the accuracy in estimation of the complexity of a target picture but it is not possible for the technique to solve the above-described problem.

The present invention has been made in view of the above-described circumstances and provides a technology of encoding a video with high quality when rate control is performed so that the bit rate of a bitstream obtained through encoding is approximated to a specific target rate.

Solution to Problem

One aspect of the present invention is a video encoding device which performs a rate control so that a rate of an output bitstream is approximated to a target rate. The video encoding device includes: an orthogonal transform unit that performs an orthogonal transform on a target picture to obtain an orthogonal transform coefficient; a quantization unit that quantizes the orthogonal transform coefficient for each macroblock of the target picture; and a quantization step calculation unit that calculates a quantization step of the macroblock to provide the quantization step to the quantization unit.

The quantization step calculation unit calculates, for a target macroblock in the target picture, the base quantization step which is a variable for matching an generated code size of the target picture with a target code size set for the target picture, determines a quantization step to be applied to quantizing for the target macroblock by weighting the calculated base quantization step with an activity of the target macroblock, and provides the quantization step to the quantization unit.

The quantization step calculation unit includes a complexity estimation unit, a complexity correction unit, and a base quantization step calculation unit.

The complexity estimation unit estimates complexities indicating difficulty of encoding, for respective macroblocks of the target picture.

The complexity correction unit corrects, for the respective macroblocks of the target picture, the complexities estimated by the complexity estimation unit by using activities so that corrected complexities are smaller as the activities are larger for the respective macroblocks to obtain the corrected complexities of the macroblocks.

The base quantization step calculation unit calculates the base quantization step by dividing a sum of the corrected complexities of the respective macroblocks of the target picture by the target code size.

A system and a method represented by rewriting the video encoding device of the above-described aspect, a program causing a computer to perform as the device, and a recording medium storing the program, are also effective as aspects of the present invention.

Advantageous Effects of Invention

The technology according to the present invention enables encoding of a video with high quality when rate control is performed so that the bit rate of a bitstream obtained through encoding a video is approximated to a specific target rate.

DESCRIPTION OF EMBODIMENTS

Figure 1:
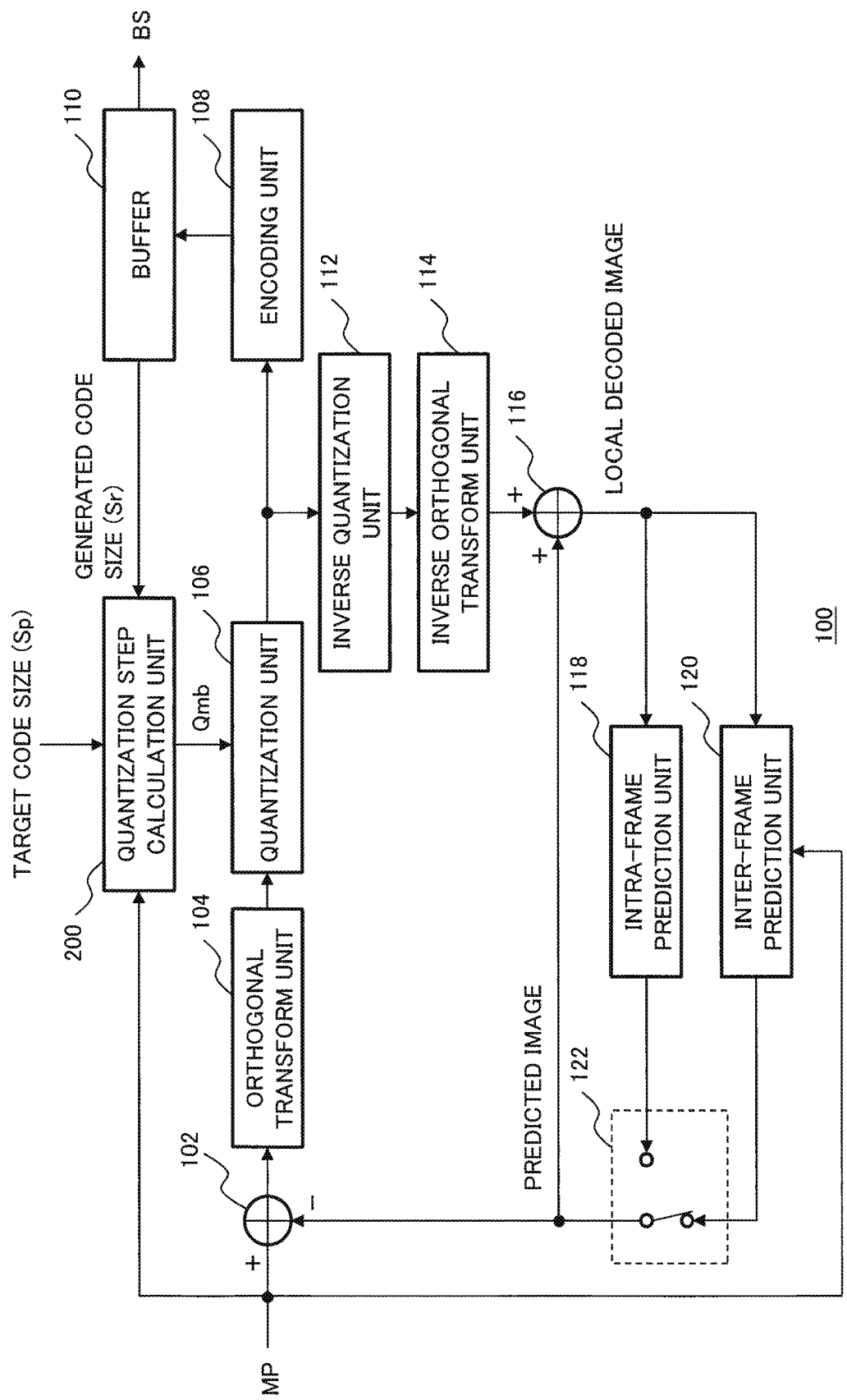
FIG. 1 is a diagram illustrating a video encoding device according to a first exemplary embodiment of the present invention.

Hereinafter, exemplary embodiments of the present invention will be described with reference to the drawings. In order to clarify the explanation, omission and simplification are suitably made for the following descriptions and the drawings. A person skilled in the art will be able to understand that it is possible to implement respective elements illustrated in the drawings as functional blocks performing various processes in various forms with combinations of hardware and software (program), and the elements are not limited to either one of hardware and software. For example, it is also possible to implement the processing of the present invention by causing a CPU (Central Processing Unit) to execute software. Note that in each drawing, the same sign is given to the same element and redundant description is omitted as appropriate.

The program mentioned above can be stored by using various types of non-transitory computer readable medium, and can be provided to a computer. The non-transitory computer readable medium includes various types of tangible storage medium. The non-transitory computer readable medium may be, for example, a magnetic recording medium (such as a flexible disk, a magnetic tape, a hard disk drive), an magneto-optical recording medium (such as a magneto-optical disc), a CD-ROM (Read Only Memory), a CD-R, a CD-R/W, and a semiconductor memory (such as a mask ROM, a PROM (Programmable ROM), an EPROM (Erasable PROM), a flash ROM, a RAM (Random Access Memory)). The program may be provided to a computer by various types of transitory computer readable medium. The transitory computer readable medium may be, for example, an electrical signal, an optical signal, and an electromagnetic wave. The transitory computer readable medium can provide the program to a computer through a wired communication path such as an electric wire and an optical fiber, or a wireless communication path.

First Exemplary Embodiment

FIG. 1 illustrates a video encoding device 100 according to a first exemplary embodiment of the present invention. The video encoding device 100 encodes a video MP at a variable rate in accordance with, for example, an MPEG format to obtain a bitstream BS and output the bitstream, and includes an arithmetic unit 102, an orthogonal transform unit 104, a quantization unit 106, an encoding unit 108, a buffer 110, an inverse quantization unit 112, an inverse orthogonal transform unit 114, an arithmetic unit 116, an intra-frame prediction unit 118, an inter-frame prediction unit 120, a switch 122, and a quantization step calculation unit 200.

The data of the video MP is received by the arithmetic unit 102. The arithmetic unit 102 calculates, for each macroblock of the input video MP, a difference between the data and data of a predicted image of the macroblock input from the intra-frame prediction unit 118 or the inter-frame prediction unit 120 through the switch 122, and outputs the difference to the orthogonal transform unit 104.

The orthogonal transform unit 104 carries out DCT processing on the output of the arithmetic unit 102, and outputs DCT coefficients obtained as a result of the processing to the quantization unit 106.

The quantization unit 106 quantizes the DCT of a target macroblock with a quantization step (which is called an "adaptive quantization step") Qmb from the quantization step calculation unit 200, and outputs the result of quantization to the encoding unit 108. Hereinafter, the output of the quantization unit 106 is also called "quantization value".

The encoding unit 108 converts the quantization value from the quantization unit 106 into a variable-length code, such as a Huffman code, and outputs the result of converting to the buffer 110.

The buffer 110 temporarily stores data from the encoding unit 108, and after that, outputs the data as the bitstream BS. Note that the storage size of the data from the encoding unit 108 is output to the quantization step calculation unit 200 as a generated code size Sr.

The quantization value obtained by the quantization unit 106 is output to the inverse quantization unit 112 in addition to the encoding unit 108. The inverse quantization unit 112 performs an inverse quantization on the quantization value from the quantization unit 106 with the adaptive quantization step Qmb used by the quantization unit 106 to obtain the DCT coefficients, and outputs the DCT coefficients to the inverse orthogonal transform unit 114.

The inverse orthogonal transform unit 114 carries out an inverse DCT processing on the DCT coefficients from the inverse quantization unit 112, obtains a prediction residual, and outputs the prediction residual to the arithmetic unit 116.

The prediction residual from the inverse orthogonal transform unit 114 and the data that is the same as the predicted image provided to the arithmetic unit 102 are input into the arithmetic unit 116. The arithmetic unit 116 obtains a local decoded image by a local decoding which adds these data, and outputs the local decoded image to the intra-frame prediction unit 118 and the inter-frame prediction unit 120.

Note that the local decoded image is the same as a decoded image obtained on a side of receiving the bitstream BS.

The intra-frame prediction unit 118 obtains a predicted image from pixels of adjacent blocks in a target picture, and outputs the predicted image to the switch 122. The inter-frame prediction unit 120 performs, using a reference picture of the target picture, detection of a motion vector, motion compensation, and the like to obtain a reference image, and outputs the reference image to the switch 122.

The switch 122 selectively outputs, to the arithmetic unit 102, the output of the intra-frame prediction unit 118 or the output of the inter-frame prediction unit 120 in accordance with a encoding mode which is set on the basis of the type (I picture, P picture, or B picture) of the target picture.

Each of the functional blocks of the video encoding device 100 is substantially the same as the corresponding functional block in this kind of video encoding device except for the quantization step calculation unit 200. Therefore, the further detailed description is omitted about these blocks.

The quantization step calculation unit 200 calculates, for the target macroblock, the adaptive quantization step Qmb which is a quantization step applied in the quantization of the target macroblock, and provides the adaptive quantization step Qmb to the quantization unit 106.

Figure 2:
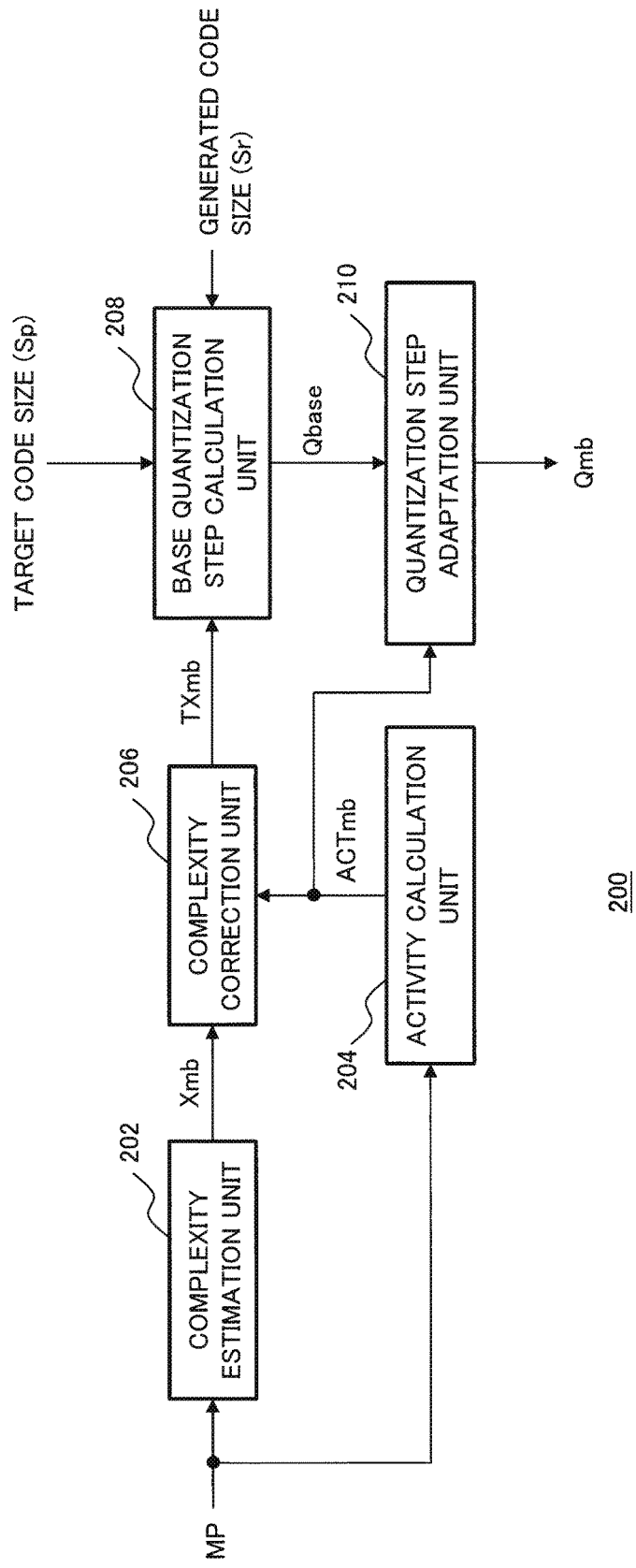
FIG. 2 is a diagram illustrating a quantization step calculation unit of the video encoding device illustrated in FIG. 1.

FIG. 2 illustrates the quantization step calculation unit 200. The quantization step calculation unit 200 includes a complexity estimation unit 202, an activity calculation unit 204, a complexity correction unit 206, a base quantization step calculation unit 208, and a quantization step adaptation unit 210.

The complexity estimation unit 202 estimates a complexity Xmb indicating the difficulty of encoding for each macroblock of the target picture, and outputs the complexity to the complexity correction unit 206.

Specifically, the complexity estimation unit 202 estimates, as the complexity Xest of the target picture, a product of a generated code size and an average quantization step of the last encoded picture whose type is the same as that of the target picture, as described in TM5 of MPEG-2, for example. The complexity estimation unit 202 obtains the complexity Xmb of each macroblock of the target picture by dividing the estimated complexity Xest by the total number n of the macroblocks in one picture.

The activity calculation unit 204 calculates an activity of each macroblock of the target picture, normalizes the activity to obtain normalized activity ACTmb, and outputs the normalized activity ACTmb to the complexity correction unit 206 and the quantization step adaptation unit 210.

For the calculation of the activity by the activity calculation unit 204, it is possible to use any of methods known hitherto, such as a technology using variance of the luminance values of each sub-block of a macroblock (Equation (2)) as described in TM5, and a technology using luminance components and chrominance components as described in PTL4.

Note that the normalization may be performed according to Equation (3) using the average value of the activities of all the macroblocks in the target picture.

For each macroblock of the target picture, the complexity correction unit 206 corrects the complexity Xmb, which the complexity estimation unit 202 obtains, by the normalized activity ACTmb, which the activity calculation unit 204 obtains, to obtain a corrected complexity TXmb. The complexity correction unit 206 outputs the obtained to the base quantization step calculation unit 208.

The complexity correction unit 206 corrects the complexity Xmb so that the corrected complexity TXmb is smaller as the normalized activity ACTmb is larger. For example, the complexity correction unit 206 corrects the complexity Xmb by using the following Equation (6). Note that j in Equation (6) is a number assigned to a macroblock.

$$TXmb(j)=Xmb(j)/ACTmb(j) \quad (6)$$

The base quantization step calculation unit 208 calculates, as a corrected complexity TXp of the target picture, the sum of the corrected complexities TXmb of respective macroblocks of the target picture, obtained by the complexity correction unit 206, in accordance with Equation (7). The base quantization step calculation unit 208 also calculates a base quantization step Qbase which is a variable for matching the sum of the generated code sizes in the target picture with the target code size Sp in accordance with Equation (8).

$$TXp=TXmb(1)+TXmb(2)+ \ldots +TXmb(n) \quad (7)$$

where n is the total number of macroblocks in one picture.

$$Qbase=TXp/Sp \quad (8)$$

As can be understood from the comparison between Equation (8) and Equation (1) described above, in the present exemplary embodiment, when the base quantization step Qbase is calculated, the corrected complexity TXp is used instead of the estimated complexity Xest of the encoded picture whose type is the same as that of the target picture.

The base quantization step calculation unit 208 outputs the base quantization step Qbase calculated by Equation (8) to the quantization step adaptation unit 210 for each of the macroblocks of the target picture. Alternatively, the base quantization step calculation unit 208 may output the base quantization step Qbase to the quantization step adaptation unit 210 as follows. The base quantization step calculation unit 208 outputs the base quantization step Qbase calculated by Equation (8) for the first macroblock of the target picture. The base quantization step calculation unit 208, for the second macroblock and macroblocks subsequent to the second macroblock, adjusts the base quantization step Qbase calculated by Equation (8) so that the sum of the generated code sizes of the target picture approaches the target code size Sp on the basis of the generated code sizes Sr of the macroblocks already encoded in the target picture, and outputs the adjusted base quantization step Qbase to the quantization step adaptation unit 210.

The quantization step adaptation unit 210 weights, for the target macroblock, the base quantization step Qbase from the base quantization step calculation unit 208 with the normalized activity ACTmb from the activity calculation unit 204 in accordance with Equation (9) to be suitable for vision characteristics. This weighting is performed according to the method of "adaptive quantizing" in TM5. In this way, the quantization step adaptation unit 210 obtains the quantization step (adaptive quantization step Qmb) to be applied for the quantization of the target macroblock. Note that, in Equation (9), the base quantization step Qbase(j) is a base quantization step for the j-th macroblock used as the target macroblock. The base quantization step Qbase(j) is the value calculated by Equation (8), or the value obtained by adjusting the value calculated by Equation (8) on the basis of the generated code size Sr of the encoded macroblock.

$$Qmb(j)=Qbase(j) \times ACTmb(j) \quad (9)$$

Figure 3:
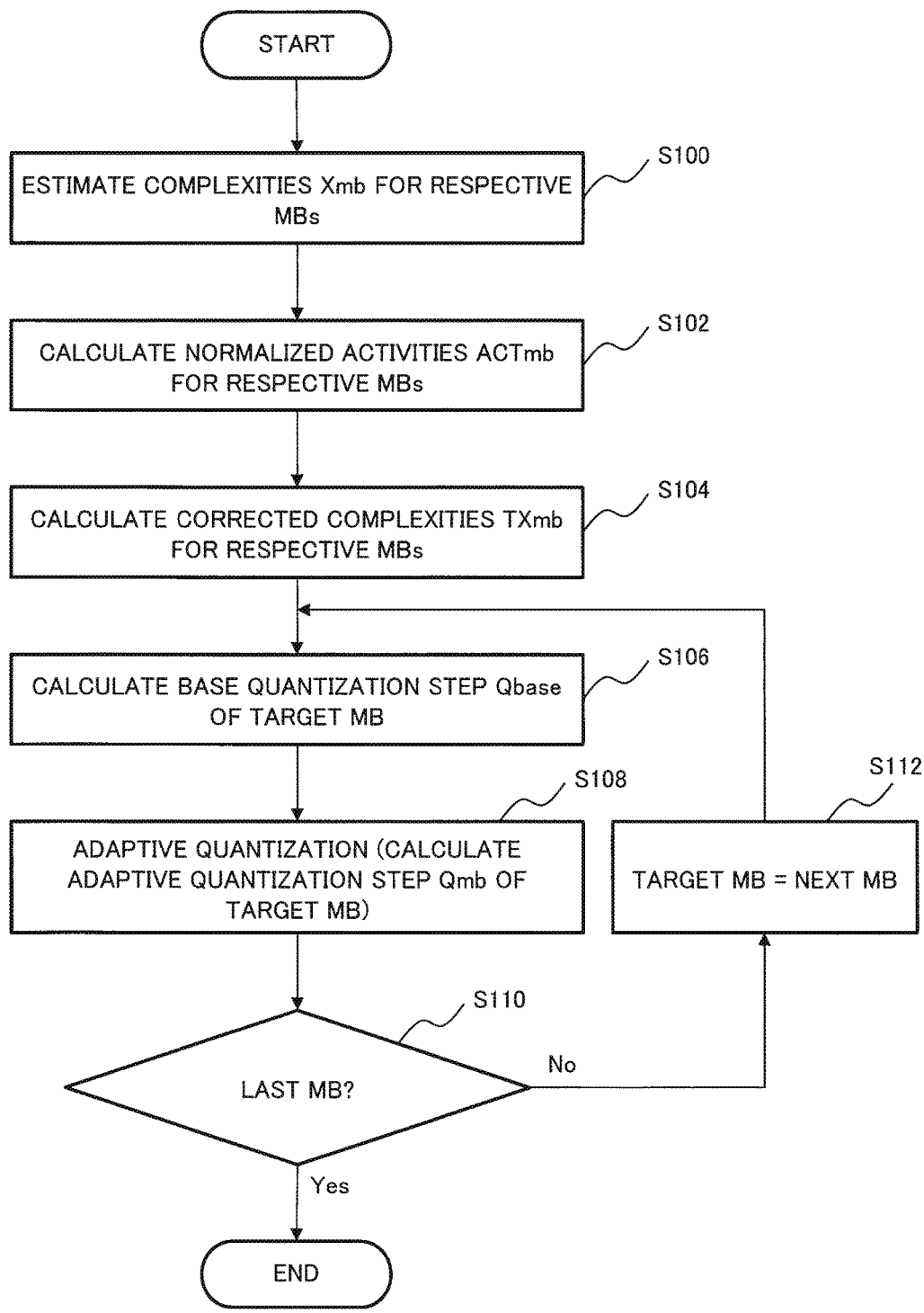
FIG. 3 is a flowchart presenting a process carried out by the quantization step calculation unit illustrated in FIG. 2.
Figure 4:
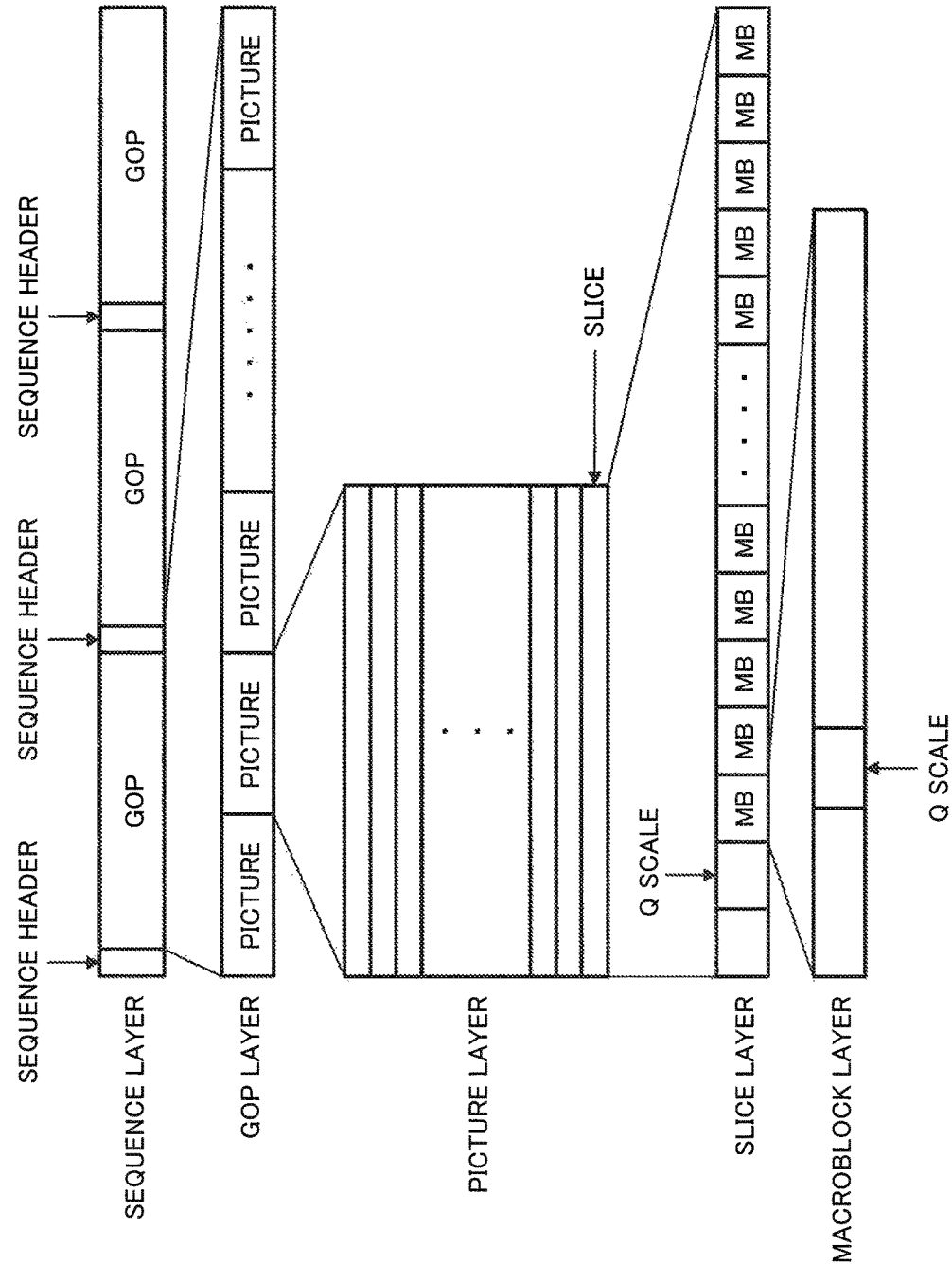
FIG. 4 is a diagram illustrating an MPEG layer structure.
Figure 5:
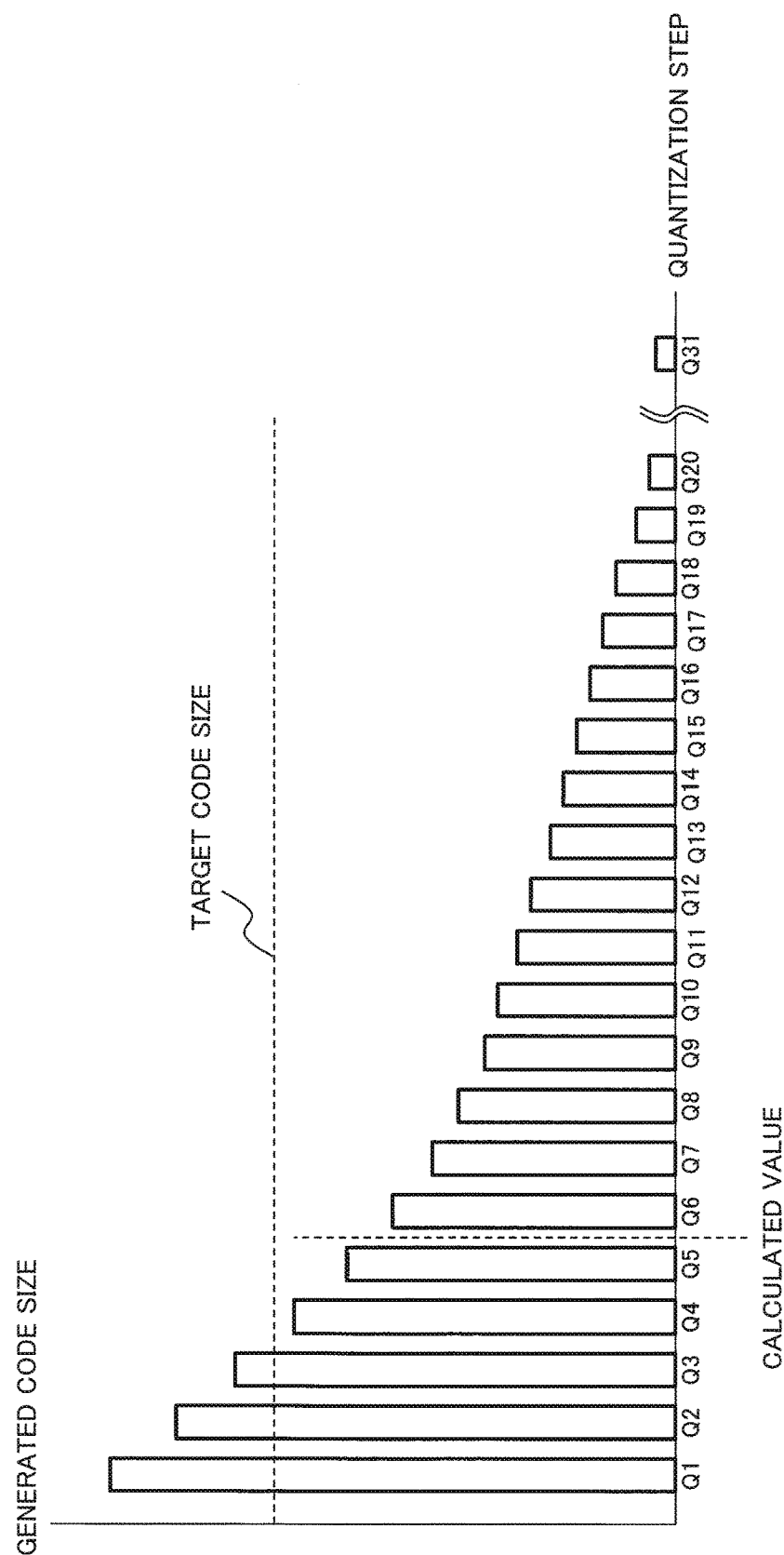
FIG. 5 is a graph representing a relationship between a quantization step and a generated code size.
Figure 6:
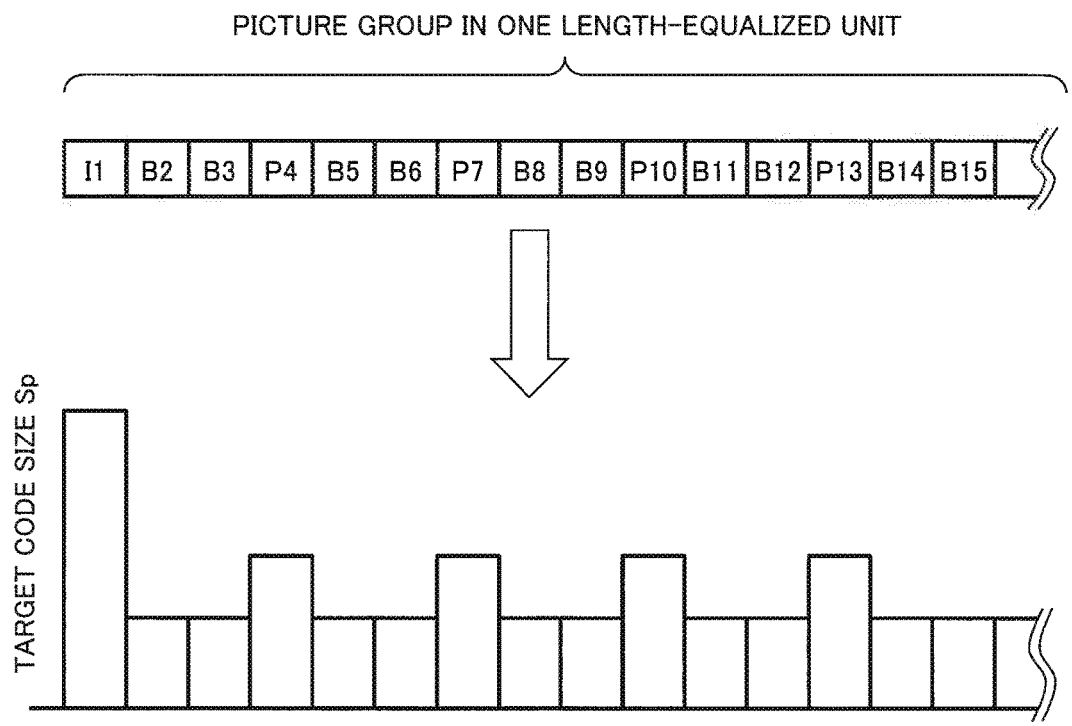
FIG. 6 is a diagram illustrating assignment of a target code sizes to pictures.

With reference to the flowchart of FIG. 3, description is made for a flow of calculation processing of the adaptive quantization step Qmb of each macroblock of the target picture performed by the quantization step calculation unit 200.

First, for all the macroblocks (MBs) of a target picture, the quantization step calculation unit 200 estimates complexities Xmb by the complexity estimation unit 202 and calculates normalized activities ACTmb by the activity calculation unit 204 (S100, and S102).

Next, for all the macroblocks, the complexity correction unit 206 corrects the complexities Xmb from the complexity estimation unit 202 with the normalized activities ACTmb from the activity calculation unit 204 to obtain corrected complexities TXmb (S104).

Then, for the first target macroblock, the base quantization step calculation unit 208 calculates a base quantization step Qbase in accordance with Equation (8) using a corrected complexity TXp which is the sum of the corrected complexities TXmb of respective macroblocks from the complexity correction unit 206, and a target code size Sp set for the target picture (S106).

Next, for the first target macroblock, the quantization step adaptation unit 210 calculates an adaptive quantization step Qmb by weighting the base quantization step Qbase with the normalized activity ACTmb, and outputs the adaptive quantization step Qmb to the quantization unit 106 (S108).

The quantization step calculation unit 200 repeats processing of steps S112, S106, and S108 (S110: No, S112, S106, and S108) until an adaptive quantization step Qmb for the last target macroblock is calculated (S110: Yes), so that each of adaptive quantization steps Qmb for all the macroblocks of the target picture is calculated.

Note that when the same base quantization step Qbase is used for all the macroblocks in the target picture, in step S106, the base quantization step calculation unit 208 outputs, for all the macroblocks, the base quantization step Qbase calculated for the first macroblock. Alternatively, after the base quantization step calculation unit 208 calculates the base quantization step Qbase for the first macroblock of the target picture in accordance with Equation (8) and outputs the base quantization step Qbase to the quantization step adaptation unit 210, the base quantization step calculation unit 208 may not output the base quantization step Qbase for other macroblocks. In this case, the quantization step adaptation unit 210 performs the above-described processing for all the macroblocks of the target picture by using the base quantization step Qbase which is output at the time of the first macroblock from the base quantization step calculation unit 208.

In addition, when the generated code size Sr of the macroblocks already encoded in the same picture is fed back to adjust the base quantization step Qbase of each remaining macroblock, the base quantization step calculation unit 208 calculates (or adjusts) the base quantization steps Qbase for the respective macroblocks.

The video encoding device 100 of the present exemplary embodiment obtains the corrected complexity TXmb by correcting the complexity Xmb estimated for each macroblock with its normalized activity ACTmb. The video encoding device 100 estimates and uses the sum of the corrected complexities TXmb as the complexity of the target picture when calculating, for each of the macroblocks of the target picture, the base quantization step Qbase which is a variable for matching the generated code size of the target picture with the target code size set for the target picture. In this way, it is possible to take a change of the generated code size due to an adaptive quantizing of the base quantization step Qbase by the quantization step adaptation unit 210 into account later in a step of determining the base quantization step Qbase. Therefore, it is possible to make the generated code size approach the target code size, and as a result, it is possible to reduce deterioration in image quality resulting from a gap of the generated code size and the target code size.

According to the video encoding device 100 of the present exemplary embodiment, even in a standard which requires a strict control of a code size in a narrow range such as a macroblock as a unit, in particular, in AVC-Intra in which an upper limit of bit amount is fixed in the unit of frame, or the like, a margin for the target code size may be reduced by the improvement in the estimation accuracy of the generated code size, and it is possible to achieve encoding with high image quality.

Second Exemplary Embodiment

In the video encoding device 100 of the first exemplary embodiment described above, the complexity estimation unit 202 of the quantization step calculation unit 200 estimates, as the complexity Xest of the target picture, the product of the generated code size and the average quantization step of the encoded picture whose type is the same as that of the target picture in accordance with the technology of TM5. Then, the complexity estimation unit 202 calculates the complexity Xmb of each macroblock by dividing the estimated complexity Xest by the total number n of macroblocks.

The technology disclosed in PTL 3, for example, may be used for the estimation of the complexity of the target picture in the complexity estimation unit 202. Specifically, the complexity Xest for an I picture to be encoded first after a scene change is estimated on the basis of the variance value of the picture, and the complexity Xest for a picture that is a P picture or a B picture to be encoded first after a scene change is estimated on the basis of an estimation error value obtained from a result of a motion vector search between the picture and a reference picture of the picture. Equation (5) is used for the estimations. For each picture other than the above pictures, as in the technique of TM5, the complexity is estimated on the basis of the generated code size and the average quantization step of the same type of picture which is encoded before.

Note that although Equation (5) is a second-degree polynomial as one example, the equation may be a first-degree polynomial, or a polynomial of third or higher degree.

Furthermore, for all the target pictures, a fixed value determined in advance may be used for each coefficient in Equation (5), or each coefficient may be adjusted dynamically by the multiple regression analysis or the like. Specifically, the complexity estimation unit 202 accumulates, for each picture type, the relationship between the complexity estimated in accordance with Equation (5) and the complexity (product of the generated code size and the average quantization step of the encoded picture) obtained from the encoding result for a number of pictures in the past, and corrects each coefficient in Equation (5) for each picture type on the basis of the accumulated data.

In this way, it is possible to improve the estimation accuracy of the complexity of the target picture in the complexity estimation unit 202. Therefore, the estimation accuracy also improves for the complexity Xmb that is the complexity of each macroblock of the target picture. As a result, the base quantization step Qbase calculated by the base quantization step calculation unit 208 and the adaptive quantization step Qmb calculated by the quantization step adaptation unit 210 are more adapted for actual complexity of the target picture. Therefore, it is possible to make the generated code size approach the target code size, and it is possible to further improve image quality.

Third Exemplary Embodiment

In the first and second exemplary embodiments described above, the same complexity Xmb is calculated for each macroblock by estimating the complexity of the target picture and dividing the estimated complexity by the total number of the macroblocks, but the complexity Xmb may be calculated for each macroblock.

In this case, following Equation (10), for example, can be used for calculation of the complexity Xmb.

$$Xmb = a \times (Fmb)2 + b \times Fmb + c \quad (10)$$

Equation (10) is obtained by replacing the feature quantity F of the entire target picture in Equation (5) with the feature quantity Fmb of the macroblock. The feature quantity F and the feature quantity Fmb are of the same type.

Needless to say, a fixed value determined in advance may also be used for each coefficient in Equation (10), and each coefficient may also be adjusted dynamically by the multiple regression analysis or the like.

In the above, the present invention is described using the exemplary embodiments. The exemplary embodiments are exemplification, and various changes, additions and omissions, and combinations with respect to the exemplary embodiments described above can be made without departing from the gist (scope) of the present invention. It is to be understood for a person skilled in the art that a modification in which these changes, additions and omissions, and combinations are made is also within the scope of the present invention.

The present application claims priority based on Japanese Patent Application No. 2013-124658, filed on Jun. 13, 2013, the entire disclosure of which is incorporated herein.

INDUSTRIAL APPLICABILITY

The present invention is applicable to encoding of video.

REFERENCE SIGNS LIST

100 Video Encoding Device
102 Arithmetic Unit
104 Orthogonal Transform Unit
106 Quantization Unit
108 Encoding unit
110 Buffer
112 Inverse Quantization Unit
114 Inverse Orthogonal Transform Unit
116 Arithmetic Unit
118 Intra-frame Prediction Unit
120 Inter-frame Prediction Unit
122 Switch
200 Quantization Step Calculation Unit
202 Complexity Estimation Unit
204 Activity Calculation unit
206 Complexity Correction Unit
208 Base Quantization Step Calculation unit
210 Quantization Step Adaptation Unit
ACTmb Normalized activity
BS Bitstream
MP Video
Qbase Base quantization step
Qmb Adaptive quantization step
Sg Desired encoded size
Sp Desired encoded size
Sr Actual encoded size
TXmb Corrected complexity
TXp Corrected complexity
Xest Complexity
Xmb Complexity

What is claimed is:

1. A moving picture encoding device comprising:
circuitry configured to:
perform an orthogonal transform on a target picture to obtain an orthogonal transform coefficient;
quantize the orthogonal transform coefficient for each macroblock of the target picture;
calculate an activity of the each macroblock based on luminance values in the each macroblock, calculate an average of activities of macroblocks in the target picture, and calculate a normalized activity of the each macroblock based on the activity of the each macroblock and the calculated average;
calculate a base quantization step of the each macroblock, wherein the base quantization step is used to match a generated code size of the target picture with a target code size set for the target picture, determine a quantization step to be applied to quantizing for the each macroblock by weighting the calculated base quantization step with the normalized activity of the each macroblock, and provide the quantization step;
estimate, as a complexity of the each macroblock, a complexity of the target picture based on a generated code size and an average quantization step of a picture of which a type is same as a type of the target picture, the complexity indicating difficulty of encoding a macroblock of the target picture;
correct the complexity of the each macroblock so that the corrected complexity of the each macroblock is the complexity divided by the normalized activity of the each macroblock; and
calculate the base quantization step of the target picture by dividing a sum of the corrected complexity of the each macroblock by the target code size.

2. A video encoding method comprising:
performing an orthogonal transform on a target picture to obtain an orthogonal transform coefficient;
quantize the orthogonal transform coefficient for each macroblock of the target picture;
calculating an activity of the each macroblock based on luminance values in the each macroblock, calculating an average of activities of macroblocks in the target picture, and calculating a normalized activity of the each macroblock based on the activity of the each macroblock and the calculated average;
calculating a base quantization step of the each macroblock, wherein the base quantization step is used to match a generated code size of the target picture with a target code size set for the target picture, determine a quantization step to be applied to quantizing for the each macroblock by weighting the calculated base quantization step with the normalized activity of the each macroblock, and provide the quantization step;
estimating, as a complexity of the each macroblock, a complexity of the target picture based on a generated code size and an average quantization step of a picture of which a type is same as a type of the target picture, the complexity indicating difficulty of encoding a macroblock of the target picture;
correcting the complexity of the each macroblock so that the corrected complexity of the each macroblock is the complexity divided by the normalized activity of the each macroblock; and
calculating the base quantization step of the target picture by dividing a sum of the corrected complexity of the each macroblock by the target code size.

3. A non-transitory computer readable medium storing a program causing a computer to execute:
performing an orthogonal transform on a target picture to obtain an orthogonal transform coefficient;

quantize the orthogonal transform coefficient for each macroblock of the target picture;

calculating an activity of the each macroblock based on luminance values in the each macroblock, calculating an average of activities of macroblocks in the target picture, and calculating a normalized activity of the each macroblock based on the activity of the each macroblock and the calculated average;

calculating a base quantization step of the each macroblock, wherein the base quantization step is used to match a generated code size of the target picture with a target code size set for the target picture, determine a quantization step to be applied to quantizing for the each macroblock by weighting the calculated base quantization step with the normalized activity of the each macroblock, and provide the quantization step;

estimating, as a complexity of the each macroblock, a complexity of the target picture based on a generated code size and an average quantization step of a picture of which a type is same as a type of the target picture, the complexity indicating difficulty of encoding a macroblock of the target picture;

correcting the complexity of the each macroblock so that the corrected complexity of the each macroblock is the complexity divided by the normalized activity of the each macroblock; and calculating the base quantization step of the target picture by dividing a sum of the corrected complexity of the each macroblock by the target code size.

* * * * *